Patented Aug. 8, 1933

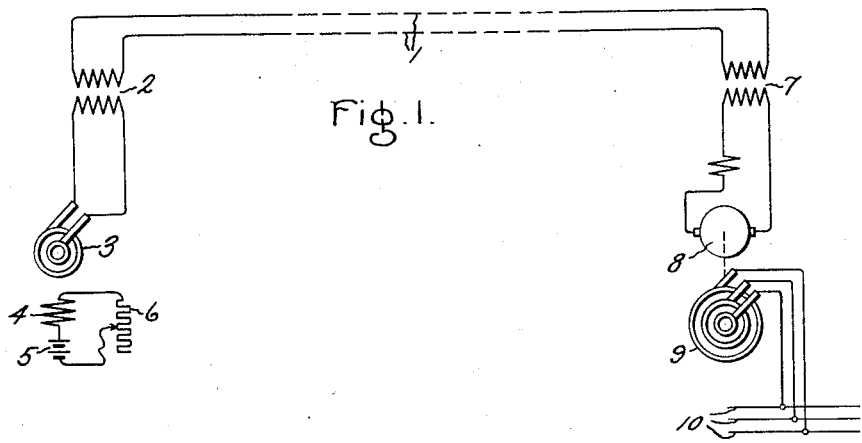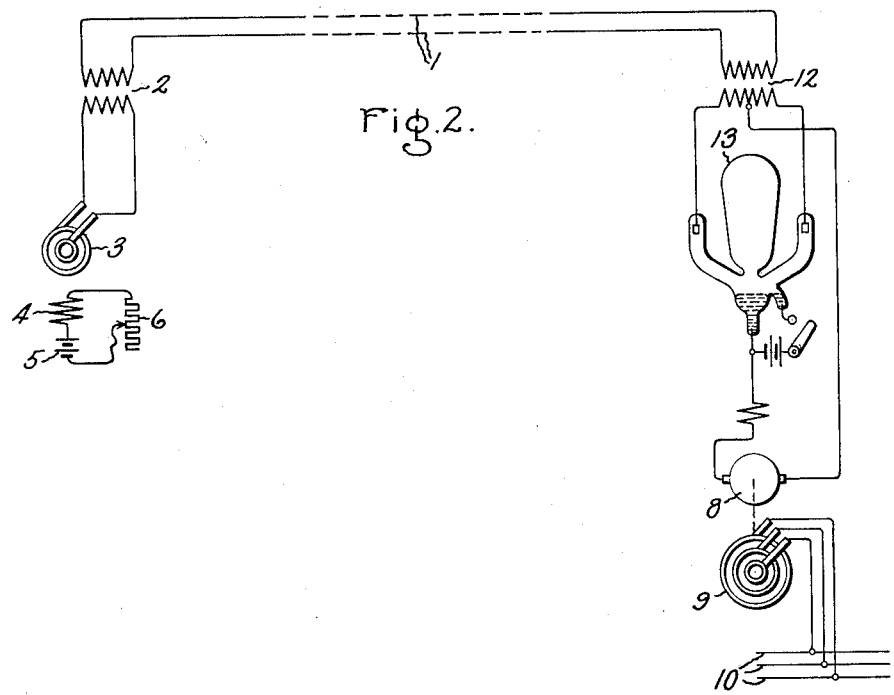

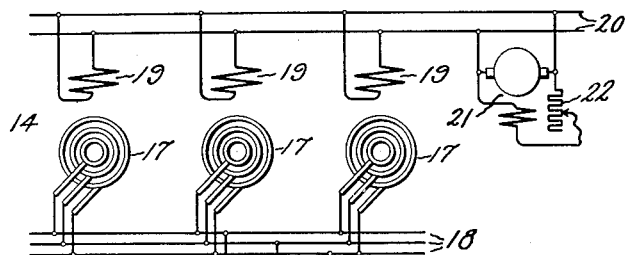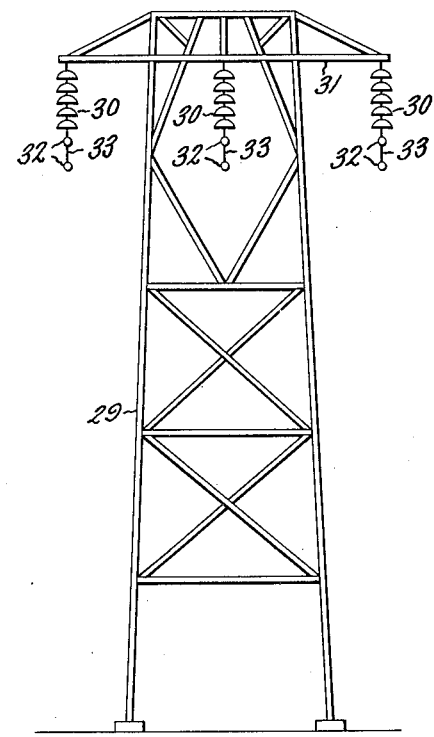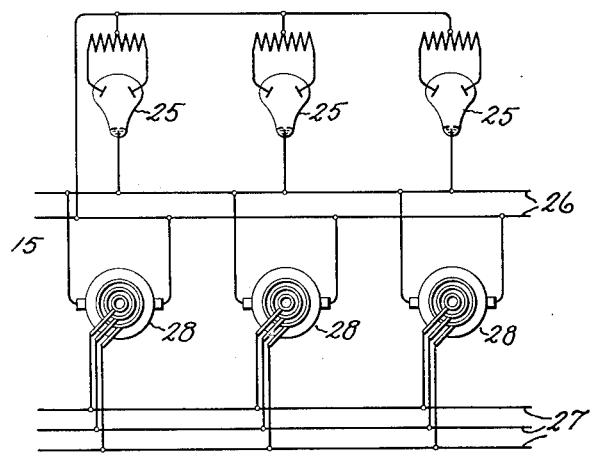

1,921,718

UNITED STATES PATENT OFFICE 1,921,718

ELECTRICAL TRANSMISSION SYSTEM

Ernst F. W. Alexanderson, Schenectady, N. Y., assignor to General Electric Company, a Corporation of New York Application December 19, 1929. Serial No. 415,307

12 Claims. (Cl. 172—237)

My invention relates to the transmission of electrical energy and particularly to the transmission of large blocks of power over long distances.

The long distance transmission of large blocks of electrical energy for commercial purposes has up to the present time, for well recognized reasons, been almost exclusively accomplished by the use of alternating currents at high voltages. Such practice has also included the use of synchronous machinery at each end of the transmission line. Systems of this kind will accordingly hereinafter be referred to as synchronous transmission systems.

As the distance of transmission for synchronous systems increases, two conflicting considerations become critical. The first is that the longer the line is to be the more power it is economically necessary to transmit. The second is that the longer the line becomes the less power it is possible to transmit between synchronous apparatus. Briefly, one important reason for this second consideration is that the power which may be transmitted between the shafts of two electrically connected synchronous machines varies, among other things, with the phase angle between the internal voltages of the machines, it being a maximum at ninety degrees, and dropping rapidly to zero when this angle is exceeded. Therefore, even though the transmitting and receiving ends of the line were to have an infinite synchronous power capacity, the mere increase in length of the line would cause an increased impedance voltage drop which in turn would cause an increased displacement in the phase angle between the internal voltages of the machines at each end of the line. If in addition to increasing the length of the line the power transmitted is also increased the ninety degree phase displacement, beyond which breakdown occurs, will rapidly be approached. Thus in the present state of the art the practical economic distance for simple straight-away synchronous to synchronous electric transmission of power with ordinary terminal apparatus, at commercially feasible voltages and frequencies, is limited to approximately 300 miles.

As a solution of this problem I propose a practical application of the phenomenon of wave transmission to the transmission of large blocks of power over long distances. By wave transmission I mean the transmission of alternating currents over conductors to a receiving device which does not cause a reflection of the oncoming transmitted wave of electrical energy. For example, it is well known that either the open-circuiting or short-circuiting of one end of a line which has an alternating voltage impressed on the other end, will cause reflection of the wave of electrical energy traveling along the line from the transmitting apparatus, in a somewhat similar manner to that in which sound waves are reflected when they encounter a medium having different physical characteristics from the medium by which they are originally propagated. This reflected wave when combined with the oncoming wave produces a so-called standing wave which in particular cases may lead to dangerous current and voltage values. Thus, if a line has its receiving end open-circuited, the reflected wave will, due to the reactance of the line and generators, combine with the transmitted wave to produce high voltage, just as in tuned antenna circuits. It has been found, however, that if the effective impedance at the end of a line is of a certain value there will be no reflection of the oncoming wave. The result will be that the voltage and current will be constant throughout the length of the line and the power factor will be unity. By effective impedance I mean broadly the ratio of voltage to amperage at the receiving end of the line and not necessarily some static device having the necessary ohmic impedance. The particular impedance which, when connected across the end of a line, does not cause reflection is one having a value equal to the surge impedance of the line.

The surge impedance of a line has been found by calculation to be equal to the square root of the ratio of the inductance of the line to its capacitance. It therefore follows that this quantity is independent of both the length of the line and the frequency of the impressed voltage wave. If, therefore, the translating devices at the receiving end of a power transmission line can be made to have the characteristics of a pure resistance equal to the surge impedance of the line, which in most cases is approximately 600 ohms for a single phase, two conductor line or, in other words, if the ratio of the voltage across their terminals to the current flowing through them can be made equal to approximately 600, for any value of power transmitted, it will be possible to transmit large blocks of power at ordinary long distance synchronous transmission voltages and frequencies over unlimited distances. However, my invention is not limited to the use of apparatus at the receiving end of the line which maintains the ratio of voltage to current equal to the surge impedance of the line at all loads or conditions of power transfer, but also includes systems where the receiving apparatus may or may not maintain this ratio at but one value of power transfer, full load for example, but which is so designed that regardless of the length of the line or, in other words, its characteristics, the voltage at the receiving end cannot exceed full load voltage, because of reflection, when the power transfer is varied. From still another aspect my invention contemplates so designing the characteristics of the receiving apparatus that its power consumption is wholly determined by its voltage, while the power flow through it is inherently unidirectional, so that entire control of the system may be accomplished from the transmitting end of the line. In addition my invention also contemplates an improved means for reducing the surge impedance of a line whereby its power wave transmitting capabilities are increased.

It is an object of my invention to provide a new and improved system for the transmission of electrical energy.

It is another object of my invention to provide a system for the wave transmission of large blocks of electrical energy over unlimited distances at the ordinary voltages and frequencies of long distance synchronous transmission.

It is a further object of my invention to provide a system for the transmission of large blocks of electrical energy which is electrically stable for any transmission distance.

It is still another object of my invention to provide a system for the transmission of large blocks of power over lines of such length that their charging currents are equal in order of magnitude to their load currents in such a way that fluctuations in load on the receiving apparatus will not cause undesired voltage rises on the line.

It is an additional object of my invention to provide a long distance non-synchronous transmission system in which the characteristics of the receiving apparatus are such that the flow of power in the line is unidirectional and the magnitude of the power transferred is a function of the voltage of the transmitting apparatus only.

It is an added object of my invention to provide a wave transmission system with a transmission line having a reduced surge impedance.

My invention will be better understood from the following description taken in connection with the accompanying drawings, and its scope will be pointed out in the appended claims.

In the drawings, Fig. 1 is a diagrammatic representation of a very simple arrangement for illustrating the principles of operation of my invention, Fig. 2 is a similar showing of a slightly more practical arrangement, Fig. 3 is illustrative of a more complex but more feasible arrangement, from a commercial point of view, than the embodiments shown in Figs. 1 and 2, while Fig. 4 is a cross-sectional view of a reduced surge impedance transmission line which may be used in my system.

Referring now to Fig. 1, which is illustrative of my invention in a simple form, 1 is a single phase transmission line, which may be of any length. Connected to the transmitting end of line 1, through a step-up transformer 2, is an alternator 3 which has a field winding 4, a source of current 5 therefor and means 6 for varying the field current. Connected to the receiving end of line 1, through a step-down transformer 7, is a single phase series motor 8 mechanically coupled to a polyphase alternator 9 which is connected to a constant frequency polyphase distribution network 10 at the receiving end of the line. Motor 8 is illustrated as a simple series motor in order more clearly to accentuate the essential features of my invention, although it will occur to those skilled in the art that in actual practice it will be preferable to provide this motor with the conventional compensating winding in order to improve its power factor. As this motor is a series motor, the ratio of its terminal voltage to its current, in amperes, is substantially constant regardless of the load upon it. I so choose the voltage ratio of transformer 7 in relation to the voltage-current rating of motor 8 that the effective impedance of the combination of transformer and motor, with respect to the line, is equal to the surge impedance of the line. If the motor itself has such an impedance the transformer ratio will be unity, but in practice it will be preferable to use a standard design motor in combination with a step-down transformer whose ratio of voltage to amperage on its primary side is equal to the line surge impedance.

The operation of the embodiment shown in Fig. 1 is as follows: Motor 8 being a series motor will have the characteristics of a resistance, that is to say, the ratio of the voltage across its terminals to the current through it is a constant regardless of the load upon it. As the motor and its transformer are so designed that this ratio, with respect to the line 1, is equal to the surge impedance of line 1 there will be no reflection at the receiving end of the line, with the result that the current and voltage will remain substantially constant throughout the length of the line for any given load. The amount of power transmitted will be governed only by the excitation and consequently the voltage of the transmitting alternator 3. As the operation of the system does not depend upon a synchronous current between synchronous machines 3 and 9, the length of the line can have no effect upon the stability of the system. The maximum power transmissible, at a given maximum voltage, will be governed primarily by the magnitude of the surge impedance of the line.

Fig. 2 differs from Fig. 1 in that the series motor at the receiving end of the line is a direct current motor which is fed from the secondary of the step-down transformer 12 at the receiving end of the line through a rectifying device 13, shown as a mercury arc rectifier, whose principle of operation is well known in the art. This is a slightly more practical arrangement than that shown in Fig. 1 for the reason that alternating current series motors are not as efficient and satisfactory in operation as are direct current series motors.

The principle of operation of this embodiment is identical with that of Fig. 1. It should be noted in connection with both Figs. 1 and 2 that there is no possibility of the apparatus at the receiving end of the line pumping back power into the line, due to the characteristics of series machines and in Fig. 2 to the additional fact that the rectifier is irreversible.

Referring now to Fig. 3, which illustrates a more practical, although more complex, arrangement than those shown in Figs. 1 and 2, in this figure 14 represents a generating station connected to a power receiving station 15 through a three phase transmission line 16, which may be of any length, for example, 750 miles or a quarter wave length at 60 cycles.

Transmitting station 14 comprises a plurality of three phase, 60 cycle, alternators 17, connected to a common bus bar 18, each of said alternators being driven by any suitable prime mover (not shown) equipped with the usual governing means for maintaining constant speed under all loads. The field winding 19 of each alternator is connected to an exciter bus 20 which is in turn connected to an exciter 21, having an adjustable rheostat 22 in its field circuit, whereby the excitation of the alternators may be varied at will. Interposed between bus 18 and line 16 is a step-up transformer 23, while interposed between line 16 and receiving station 15 is a step-down transformer 24. Each of the three secondary windings of transformer 24 is connected for full wave rectification to a rectifying device 25, which as shown is an ordinary mercury arc rectifier, for feeding a direct current bus bar 26. Connected to draw power from direct current bus 26 and feed it to an alternating current distribution circuit 27 are a plurality of inverters, shown as inverted synchronous converters 28, although any other suitable means for derectifying direct current into alternating current, such as a grid controlled vapor electric device and its attendant apparatus, as described in my joint United States Patent 1,655,036, January 3, 1928, which is assigned to the same assignee as this application, might also be employed. As inverters 28 do not have the characteristics of series wound machines, it is desirable that transformer 24 be so designed that for the usual conditions of power transfer the ratio of the voltage across it to the current through it should equal the surge impedance of the line, so that wave transmission may be realized during usual conditions of power transfer. This will usually be when full load power is being transferred over the line. Distribution circuit 27 represents a large network which is always capable of receiving all the power which transmitting station 14 can send over the line.

The operation of this embodiment is as follows: Due to the fact that circuit 27 represents a large distribution network, to which are connected other generating apparatus as well as many load devices, its voltage remains practically constant. Hence, there is always counter voltage across the electrodes of rectifiers 25, which is transmitted through the converters 28. The result is that receiving station 15 may be likened to a dam which prevents the flow of water unless the water level is above the height of the dam. Thus, unless the voltage of bus 18 at the transmitting station 14, and hence the line voltage, is high enough to overcome this counter voltage, there can be no transfer of power. Carrying the simile a step further, receiving station 15 is like a very long dam, so that a great volume of water can flow over it with but a very small head. This is due to the characteristics of synchronous converters. Thus it is impossible for the voltage at the receiving end of the line to rise appreciably above normal. In normal operation the excitation of alternators 17 will be so regulated that full load power is being transmitted over the line. Under these conditions, due to the characteristics of transformer 24 there will be no reflection at the end of the line and power will be transmitted at unity power factor by a pure traveling wave in the line. If now for any reason it is desired to transmit less than full load power, the excitation of alternators 17 is reduced slightly. However, as the characteristics of the receiving circuit are different from those of a series wound machine, the reduction in voltage and consequently in the power transmitted will disturb the ratio between voltage and current, with the result that there will be reflection instead of pure absorption of energy by the receiving circuit. By virtue of this reflection, the voltage at the receiving end of the line will remain at normal even though the voltage at the transmitting end is reduced if the line is long enough with respect to the wave length of the transmitted energy. Thus, if the voltage should tend to rise above normal, the rapid increase in current flow will effectually prevent this voltage from increasing appreciably beyond normal. It is to be noted that this also holds true for Figs. 1 and 2, for the voltage across the series machines cannot rise without causing a corresponding increase in current.

Referring now to Fig. 4. This figure represents a cross-sectional view of a three phase transmission line which preferably would be used in the system illustrated by Fig. 3. In this figure a suitable supporting tower 29 supports the three phases in the conventional manner through suspension insulators 30, hung from cross arm 31. Each of the phase conductors is divided into a plurality of, shown as two, spaced parallel conductors 32, which, as shown, are hung in vertical alinement for convenience. Conductors 32 are separated by any suitable means, shown as members 33.

The use of a plurality of conductors per phase, instead of a single conductor, has several advantages. In the first place, the electrostatic, or charging, current between phases is greater, due to the increased surface area per phase, and hence the surge impedance is reduced. Thus as the full load current of a wave transmission system is equal to the voltage divided by the surge impedance, the line with a lower surge impedance will carry corresponding more power. In the second place, the plurality of conductors per phase will mutually shield each other electrostatically, so that the line can be operated at a higher voltage without corona. The actual dimensions of such a line represents a compromise, for the greater the ratio of conductor spacing to conductor diameter, the greater the capacitance while the greater the ratio of phase conductor spacing to conductor spacing in each phase conductor the greater the shielding effect Thus calculations show that if each conductor is divided into two parallel conductors one and a quarter inches in diameter, mounted three feet apart in each composite conductor and twenty feet apart as between phases, the surge impedance of the line will be approximately 430 ohms as compared with approximately 600 ohms for the ordinary line, while the maximum permissible voltage, employing the same factor of safety as for a single conductor per phase line, will be 390,000 volts. At this voltage and operating under wave transmission the line would carry approximately 900 amperes in each composite conductor and a three phase line would therefore allow a power transfer of 600,000 kilowatts.

A line of this design may be used equally well for a transmission distance of 300 miles or for 500 miles, or for even greater distances with the only difference that the energy loss in the line is proportional to the distance, whereas with an ordinary transmission line and ordinary terminal apparatus operating at 220,000 volts, under 60 cycle synchronous operation it appears that in the case of a 300 mile line, the power per transmission line is limited by synchronous stability to about 100,000 kilowatts. Thus it would require six transmission lines to transmit 600,000 kilowatts. With a transmission distance of 500 miles, synchronous transmission is not economically possible at all unless intermediate stations or other special devices are used for stabilizing the line. If higher voltages are used the difficulty of synchronous stability becomes still greater on account of the large capacity current and therefore the use of higher voltages has so far not shown any economic advantage.

If the individual conductors, of the line shown in Fig. 4 are standard aluminum steel core conductors having a resistance of 0.0167 ohms per thousand feet, the calculated energy loss in a 300 mile line operating under wave transmission and carrying 600,000 kilowatts at 390,000 volts would be 6.1% and in a 500 mile line it would be 10.2%. It is therefore apparent that it is technically possible to transmit large amounts of electrical energy over still greater distances without any other limitation than the energy loss in the line.

While I have shown and described particular embodiments of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. A system for the transmission of large blocks of power over long distances comprising an alternating current generator, means for varying the voltage of said generator, a transmission line having a charging current of the order of magnitude of the full load current, and a variable power absorbing receiving circuit, said circuit having an effective impedance with respect to said transmission line which is equal to the surge impedance of said line over a wide range of power absorption.

2. A system for the transmission of large blocks of power over long distances comprising an alternating current generator, a transmission line having a charging current of the order of magnitude of the full load current and a receiving circuit, said circuit comprising means for preventing a reversal of power flow therethrough, said circuit having an impedance equal to the surge impedance of the transmission line at at least one predetermined value of its power absorption.

3. A system for the transmission of large blocks of power over long distances comprising an alternating current generator, a transmission line having a charging current of the order of magnitude of the full load current and a receiving circuit, said circuit comprising means for preventing a reversal of power flow therethrough, said circuit having an impedance equal to the surge impedance of the transmission line at full load power transfer of said system.

4. A power transmission system comprising an alternating current generator, a transmission line, and a receiving circuit, said receiving circuit including a rectifying device, a de-rectifying device, and an alternating current network capable of receiving the maximum power which said system is designed to transmit, the ratio of the voltage to the current at the receiving end of the line at full load being numerically equal to the surge impedance of said line.

5. A system of power transmission comprising a three phase alternator, a step-up transformer connected thereto, a transmission line connected to the transformer, a receiving circuit comprising a step-down transformer connected to the receiving end of said line, a rectifying device connected to said transformer, a de-rectifying device connected to said rectifying device and a synchronous distribution network connected to said de-rectifying device, said network being capable of absorbing the maximum power said system is designed to transmit, said receiving circuit being so constructed that the ratio of its terminal voltage to the current received by it, during normal power transfer, is numerically equal to the surge impedance of said line.

6. An electrical power transmission system including, in combination, a power transmitting station including a synchronous generator, a power receiving station including a synchronous generator, a transmission line connecting said stations, and power translating means for converting the electrical energy transmitted by said line into mechanical energy for driving the generator of said receiving station, said translating means having an effective impedance with respect to the transmission line which is equal to the surge impedance of said line.

7. An electrical power transmission system including, in combination, a power transmitting station including a synchronous generator, a power receiving station including a synchronous generator, a transmission line connecting said stations, an asynchronous power translating means for converting the electrical energy transmitted by said line into mechanical energy for driving the generator of said receiving station interposed between said line and the generator of said receiving station, said translating means having an effective impedance with respect to the transmission line which is equal to the surge impedance of said line for at least one value of power flow through said line.

8. An electrical power transmission system including, in combination, a power transmitting station including a synchronous generator, a power receiving station including a synchronous generator, a transmission line connecting said stations, an asynchronous power translating means for converting the electrical energy transmitted by said line into mechanical energy for driving the generator of said receiving station interposed between said line and the generator of said receiving station, said translating means having an effective impedance with respect to the transmission line which is equal to the surge impedance of said line at all values of power flow through said line.

9. An electrical power transmission arrangement having, in combination, a transmitting station including a synchronous generator, a receiving system including a synchronous machine for supplying power to said system, a transmission line connected to said synchronous generator, an asynchronous power translating means interposed between said line and the synchronous machine of said receiving system, said translating means having a ratio of voltage to amperage which is numerically equal to the surge impedance of said line in ohms.

10. A system of power transmission comprising, an alternating current generator, a transmission line having one end connected to said generator, a series motor connected to the other end of said line, said motor having an effective impedance with respect to said line which is substantially equal to the surge impedance of said line.

11. A system of power transmission comprising, an alternating current generator, a transmission line having one end thereof connected to said generator, a transformer connected to the other end of said line, a series motor connected to be energized from said transformer, said transformer having such a voltage ratio that with full load on said motor the ratio of voltage to amperage of said transformer with respect to the transmission line is equal to the surge impedance of said line, said motor serving to maintain said ratio substantially constant over a relatively wide range of load on said motor.

12. A system of electrical power transmission comprising, an alternating current generator, a transmission line connected thereto, a transformer connected to said line, a rectifier connected to said transformer, a direct current series motor connected to said rectifier, said transformer having such a ratio of transformation that its effective impedance with respect to said transmission line is substantially equal to the surge impedance of said line.

ERNST F. W. ALEXANDERSON.